United States Patent [19]

Kiyono

[11] Patent Number: 4,795,192
[45] Date of Patent: Jan. 3, 1989

[54] LIP SUITABLE FOR USE WITH GUIDE RAIL OF PASSIVE SEAT BELT SYSTEM

[75] Inventor: Shunichi Kiyono, Kanagawa, Japan

[73] Assignee: NSK-Warner KK, Tokyo, Japan

[21] Appl. No.: 112,454

[22] Filed: Oct. 26, 1987

[30] Foreign Application Priority Data

Oct. 30, 1986 [JP] Japan .......................... 61-165657[U]

[51] Int. Cl.$^4$ ............................................. B60R 22/06
[52] U.S. Cl. ..................................................... 280/804
[58] Field of Search ............................ 280/804; 296/93

[56] References Cited

U.S. PATENT DOCUMENTS 4,635,964  1/1987  Ryu ....................................... 280/804
4,685,718  8/1987  Steenblik et al. ..................... 296/93

FOREIGN PATENT DOCUMENTS 61-133449  8/1986  Japan .

*Primary Examiner*—Kenneth R. Rice
*Attorney, Agent, or Firm*—Wegner & Bretschneider

[57] ABSTRACT

Provided is a lip suitable for use with a guide rail of a passive belt system. The guide rail defines an elongated slot through a wall thereof so as to permit displacement of a webbing-carrying movable member along the length of the guide rail. The lip is formed of a lip main body and a gill. When the lip is provided with the guide rail, the lip main body extends along the outer surface of a side wall of the guide rail toward the slot. The gill branches out from a part of the lip main body, which part is located in the vicinity of a free edge of the lip main body. Where the guide rail has a substantially U-shaped transverse cross-section, the lip may preferably be provided on each longitudinal outer side wall of the guide rail.

12 Claims, 3 Drawing Sheets

LIP SUITABLE FOR USE WITH GUIDE RAIL OF PASSIVE SEAT BELT SYSTEM

BACKGROUND OF THE INVENTION (1) Field of the Invention

This invention relates to a lip suitable for attachment on at least one side of a guide rail of a passive seat belt system which is adapted to apply a webbing automatically on an occupant in an automotive vehicle or the like.

(2) Description of the Prior Art

Reflecting the recent mandatory requirement for the use of a seat belt system in an automotive vehicle, more and more interests have been drawn on passive seat belt systems adapted to apply and release a webbing automatically. With a view toward facilitating the present invention, one example of such passive seat belt systems will be described first with reference to FIG. 1 which is a partly cross-sectional side view of the exemplary passive seat belt system. Designated at numeral 1 is an occupant, while numeral 2 indicates a seat. A slider 22 is attached to an outer end portion 11 of a webbing 10 by way of an anchor 21. An inner end portion 12 of the webbing 10 is taken up by a retractor 9 provided on a floor 8 of a motor vehicle, so that the webbing 10 is pulled in and out of the retractor 9. The above-mentioned slider 22 is caused to slide in a slider channel 7 which is defined in a guide rail 6. The guide rail 6 extends along a front pillar 3, roofside 4 and an upper part of a center pillar 5. The slider 22 is driven by a drive tape which extends through a tape track 23 and the guide rail 6. The drive tape is driven by a sprocket provided within a sprocket housing 24 and driven by a motor 25.

Let's now assume that an associated door of the motor vehicle has been opened. The webbing 10 is then caused to move to a front end of the guide rail 6, said front end being located on the front pillar 3, by the slider 22 driven by the motor 25, whereby the occupant 1 is allowed to sit in the seat 2 without being obstructed by the webbing 10. When the door is closed, the slider 22 is caused to move to a rear end of the guide rail, said rear end being located on the center pillar 5, so that the webbing 10 is automatically applied to the occupant 1.

Flexible lips are provided respectively on both sides of the guide rail 6 (i.e., on the side of an associated body member and on the side of an associated interior trim), whereby intrusion of foreign materials such as rain water and dust is prevented, possible deterioration of rail parts by sunlight is avoided and sliding noises of the slider are shielded in. A conventional lip structure is now described with reference to FIG. 2 which is a transverse cross-section of the conventional lip structure. The guide rail 6 is interposed between a body member 31 and an interior trim 32 and a slide anchor 34 is caused to slide within the channel 7 defined within the guide rail 6. The outer end portion 11 of the webbing 10 is attached to the exposed end of the slide anchor 34. On both side walls, flexible lips 40,40 are attached as mentioned above, by an desired method, for example, by adhering the flexible lips 40,40 to the outer surfaces of the side walls of the guide rail 6 or fitting the flexible lips 40,40 on the outer surfaces of the side walls of the guide rail 6. A free edge 42 of each lip 40 is bent inwardly so as to maintain the lip 40 in contact with the slide anchor 34 at the free edge 42. In this conventional construction, it is impossible to conceal gaps between the body member 31 and interior trim 32 and the corresponding side walls of the guide rail 6. The conventional construction is hence poor in external appearance. For good external appearance, the above-described gaps must have a constant width. It is however difficult to ensure gaps of a constant width due to deviations in the attachment accuracy of the guide rail and the dimensional accuracy of the interior trim and body member. The width of such a gap on each side of the guide rail hence varies along the length of the guide rail and may be reduced even to zero at some longitudinal part or parts of the guide rail. The conventional construction is therefore not attractive in external appearance.

SUMMARY OF THE INVENTION

With the foregoing in view, the present invention has as a principal object the provision of a lip which is suitable for use with a guide rail of a passive seat belt system and is free of the drawback of the above-described conventional construction.

It has now been found that a gill branched out as an integral element from a lip can absorb deviations in dimensional accuracy of associated parts and can hence conceal a gap between a guide rail and its associated member.

In one aspect of this invention, there is hence provided a lip suitable for use with a guide rail of a passive seat belt system. The guide rail defines an elongated slot through a wall thereof so as to permit displacement of a movable member along the length of the guide rail. The guide rail is adapted to be mounted on a stationary base, whereby a webbing fastened at one end thereof to the movable member is displaceable between an occupant-releasing position and an occupant-restraining position. The lip comprises a lip main body and a gill, and the lip main body extends along the outer surface of a side wall of the guide rail toward the slot when the lip is provided with the guide rail. The gill branches out from a part of the lip main body, which part is located in the vicinity of a free edge of the lip main body.

Owing to the above-described construction of the lip according to the present invention, the gill branched out from the lip main body is maintained in contact with an associated element. The gill can therefore absorb deviations in dimensional accuracy of the guide rail and the associated element and conceal a gap between the guide rail and the associated element, whereby the external appearance has been improved.

BRIEF DESCRIPTION OF THE DRAWINGS

The above and other objects, features and advantages of the present invention will become apparent from the following description of the invention and the appended claims, taken in conjunction with the accompanying drawings, in which:

DETAILED DESCRIPTION OF THE INVENTION AND PREFERRED EMBODIMENT

Figure 1:
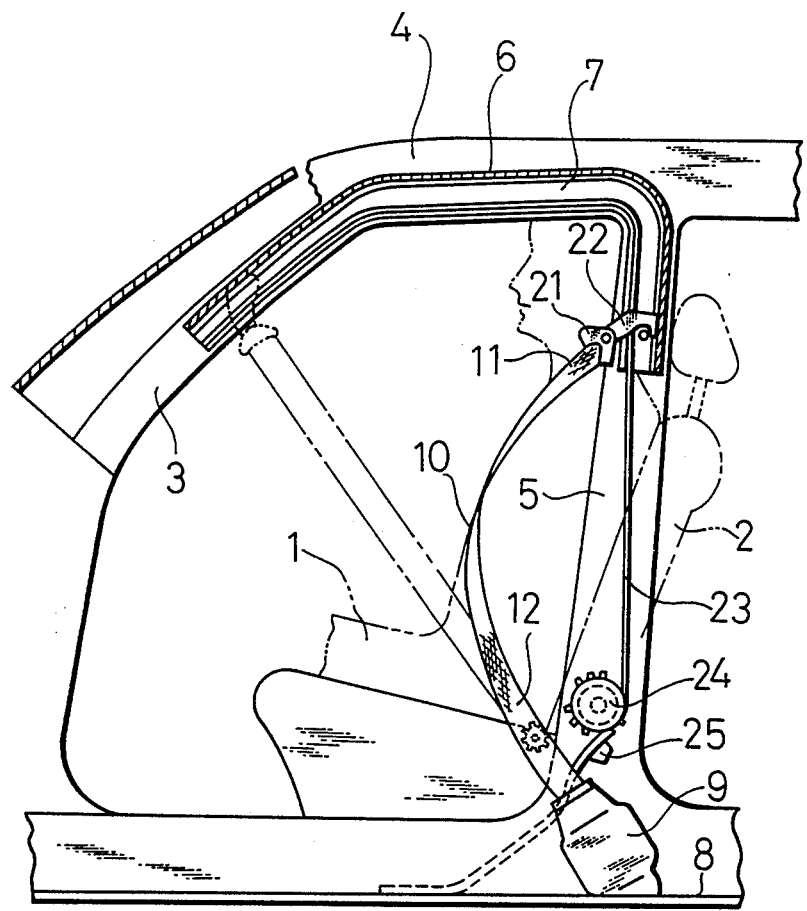
FIG. 1 is a partly cross-sectional side view of an exemplary passive seat belt system.
Figure 2:
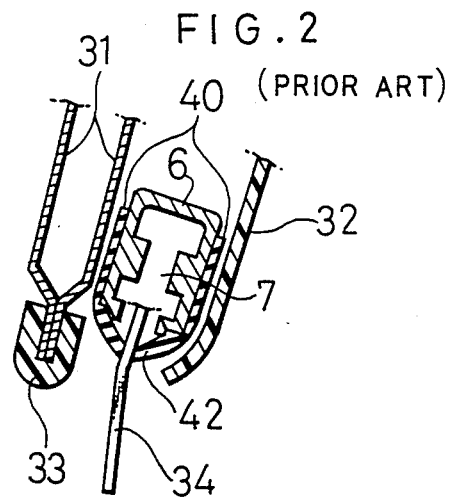
FIG. 2 is a transverse cross-sectional view of a conventional lip and its associated elements.
Figure 3:
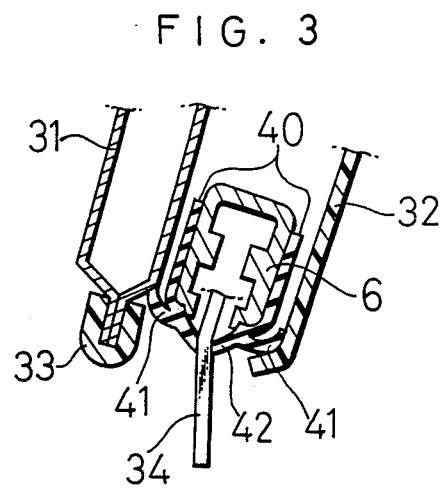
FIG. 3 is a transverse cross-sectional view of lips according to one embodiment of this invention and their associated elements.
Figure 5:
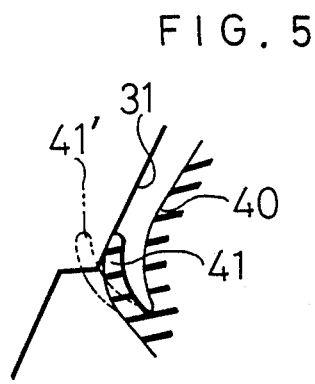
FIG. 5 illustrates the function of a gill of the left-hand lip.
Figure 4:
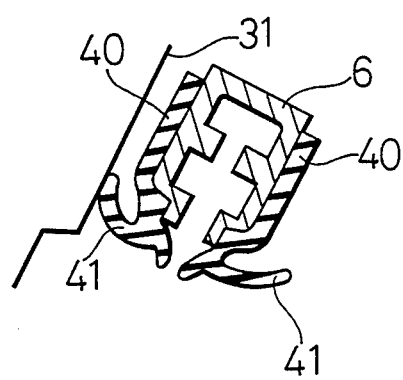
FIG. 4 illustrates, on an enlarged scale, the lips and their associated guide rail and body member.

Referring first to FIG. 4, the lips according to said one embodiment of the present invention are provided respectively on both sides of the guide rail. Namely, the lip 40 attached on each side wall of the guide rail 6 has a gill 41 branched out therefrom as an integral element. On the side of a stationary base, a free edge of the gill 41 is in contact with the body member 31 or weld 33. On the side of the interior trim 32, a free edge of the associated gill 41 is maintained in contact with the interior trim 32. The gills 31 therefore conceal the gaps between the body member 31 and interior trim 32 and the corresponding side walls of guide rail 6. Like the prior art construction shown in FIG. 2, the free edge of each lip main body is in contact with the slide anchor 34. FIG. 4 shows the lips 40,40 on an enlarged scale, while the function of each gill 41 is illustrated in FIG. 5. Where the gap between the lip 40 and the body member 31 has a constant width (this also applies equally to the trim member 32), the gill takes a position 41' indicated by broken lines. Even where the width of the gap is narrower due to a dimensional deviation as shown in the drawing, the gill 41 is allowed to flex inwardly to absorb the deviation.

Figure 6:
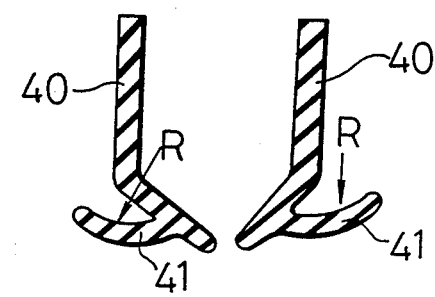
FIGS. 6 through 11 show modifications of the gill in a transverse cross-section.
Figure 7:
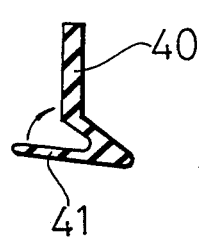
Figure 8:
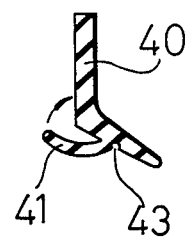
Figure 9:
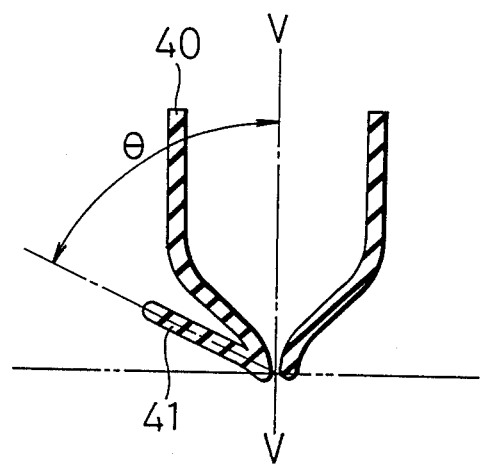
Figure 11:
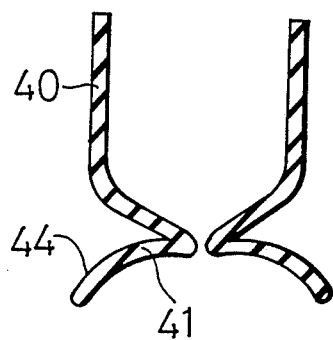
Figure 10:
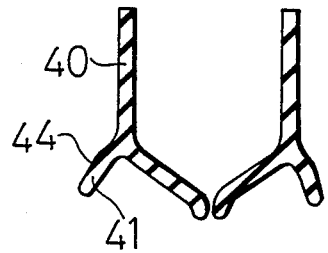

Various gill shapes are depicted as modifications in FIG. 6 and its subsequent drawings. In the modification shown in FIG. 6, the gill 41 branched out from the lip 40 has an arcuate shape whose radius is indicated by R, so that the gill 41 is allowed to flex inwardly with ease. In the modification depicted in FIG. 7, the gill 41 is formed thinner than a main body of the lip 40 so that the gill 41 is allowed to flex inwardly with ease as indicated by an arrow. In the modification illustrated in FIG. 8, a groove is formed in the gill 41 along its proximal edge where the gill branches out from the lip 40, whereby the gill 41 is allowed to flex easily. In the modification shown in FIG. 9, the gill 41 extends from the lip 40 at an angle $\theta$ smaller than 90 degrees relative to a center line V—V between both lips 40,40. In the modifications depicted in FIGS. 10 and 11 respectively, the bent directions of the gills are opposite to those of the gills in the above-described embodiment and modifications. Namely, each gill 41 is brought into contact with a body member or interior trim at an upper surface 44. In the modifications shown in FIGS. 7, 9 and 11 respectively, the gills 41 are branched out from parts of the corresponding lips 40, which parts are located in the vicinity of free edges of the corresponding lips 40. In FIGS. 3-6 and FIG. 8, the gills are convex in directions away from the lip main bodies of the corresponding lips.

Having now fully described the invention, it will be apparent to one of ordinary skill in the art that many changes and modifications can be made thereto without departing from the spirit or scope of the invention as set forth herein.

I claim:

1. A passive seat belt system comprising:
   a guide rail having a substantially turned U-shaped transverse cross-section and defining an elongated slot through a lower wall thereof, said guide rail being adapted to be mounted on a vehicle body;
   a movable member in the slot, capable of movement along the length of the guide rail;
   a webbing having one end fastened to the movable member, displaceable between an occupant-releasing position and an occupant-restraining position;
   a lip comprising:
     a lip main body having a free edge;
     a gill having a tip,
     said lip main body extending along the outer surface of a side wall of the guide rail toward the slot, the gill branching out from a part of the lip main body located in the vicinity of the free edge of the lip main body, the tip of the gill being adapted to contact the vehicle body so as to conceal a gap between the guide rail and the vehicle body on the side of the lower wall of the guide rail.

2. The lip as claimed in claim 1, wherein the gill extends form the part of the lip main body at an acute angle relative to a plane in which the lip main body lies.

3. The lip as claimed in claim 1, wherein the gill has an arcuate shape as viewed in a transverse cross-section of the lip.

4. The lip as claimed in claim 3, wherein the gill is convex in a direction away from the lip main body of the lip.

5. The lip as claimed in claim 1, wherein the gill is formed thinner than the lip main body of the lip.

6. The lip as claimed in claim 1, wherein a groove is formed in the gill along the proximal edge thereof.

7. A passive seat belt system comprising:
   a guide rail having a substantially turned U-shaped transverse cross-section and defining an elongated slot through a lower wall thereof, said guide rail being adapted to be interposed between a vehicle body and a interior trim;
   a movable member mounted in the slot, capable of movement along the length of the guide rail,
   a webbing having one end fastened to the movable member, displaceable between an occupant-releasing position and an occupant-restraining position;
   a lip comprising:
     a lip main body having a free edge;
     a gill having a tip,
     said lip main body extending along the outer surface of a side wall of the guide rail toward the slot, the gill branching out from a part of the lip main body located in the vicinity of the free edge of the lip main body, the tip of the gill being adapted to contact the interior trim so as to conceal a gap between the guide rail and the interior trim on the side of the lower wall of the guide rail.

8. The lip as claimed in claim 7, wherein the gill extends from the part of the lip main body at an acute angle relative to a plane in which the lip main body lies.

9. The lip as claimed in claim 7, wherein the gill has an arcuate shape as viewed in a transverse cross-section of the lip.

10. The lip as claimed in claim 9, wherein the gill is convex in a direction away from the lip main body of the lip.

11. The lip as claimed in claim 7, wherein the gill is formed thinner than the lip main body of the lip.

12. The lip as claimed in claim 7, wherein a groove is formed in the gill along the proximal edge thereof.

* * * * *